(12) United States Patent
Zhu

(10) Patent No.: US 7,914,921 B2
(45) Date of Patent: Mar. 29, 2011

(54) ENHANCED SEPARATORS FOR ZINC NEGATIVE ELECTRODES

(75) Inventor: Zhijian Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1070 days.

(21) Appl. No.: 11/187,540

(22) Filed: Jul. 22, 2005

(65) Prior Publication Data

US 2006/0024570 A1 Feb. 2, 2006

(30) Foreign Application Priority Data

Aug. 2, 2004 (CN) ........................ 2004 2 0723248 U

(51) Int. Cl.
*H01M 2/18* (2006.01)
*H01M 2/14* (2006.01)

(52) U.S. Cl. ........ 429/144; 429/129; 429/142; 429/143; 429/146

(58) Field of Classification Search ............... 429/70, 429/143–147, 212, 216, 247, 206, 129; 29/623.1–623.2, 623.4–623.5; 144/136.1, 144/136.3; 180/65.3; 903/907
See application file for complete search history.

(56) References Cited

U.S. PATENT DOCUMENTS

| 1,823,031 | A | * | 9/1931 | Dalen | 144/136.1 |
| 3,537,908 | A | * | 11/1970 | Doll et al. | 429/143 |
| 3,539,396 | A | * | 11/1970 | Wagner | 429/28 |
| 3,970,472 | A | * | 7/1976 | Steffensen | 429/206 |
| 4,000,005 | A | * | 12/1976 | McBreen | 429/212 |
| 4,218,521 | A | * | 8/1980 | Putt et al. | 429/39 |
| 6,330,925 | B1 | * | 12/2001 | Ovshinsky et al. | 180/65.3 |

* cited by examiner

*Primary Examiner* — Dah-Wei D Yuan
*Assistant Examiner* — Claire L (Rademaker) Roe
(74) *Attorney, Agent, or Firm* — Venture Pacific Law, PC

(57) ABSTRACT

The present invention discloses enhanced separators for storage batteries with zinc negative electrodes. These enhanced separators include a separator layer and one or more resistive layers on said separator layer. The dimensions of the one or more resistive layers are less than or equal to that of the separator layer. Portions of the separator layer can also be treated with a PTFE suspension to increase the resistance at those portions. For storage batteries where the resistance along two edges of the separator layer has to be larger then the center, the enhanced separator include said resistive layers where each layer includes two independent parts positioned along the two edges of the separator layer. The edge portions of the separator layer can also be treated with a PTFE suspension. Using these enhanced separators in storage batteries with zinc negative electrodes can increase the capacity and prolong the life of the batteries. These enhanced separators are also simple, easy to manufacture, and low in cost.

17 Claims, 2 Drawing Sheets

ENHANCED SEPARATORS FOR ZINC NEGATIVE ELECTRODES

CROSS REFERENCE

This application claims priority from a Chinese patent application entitled "Electrode Separators for Zinc Negative Electrodes of Storage Batteries" filed on Aug. 2, 2004, having a Chinese Application No. 200420072324.8. This Chinese application is incorporated herein by reference.

FIELD OF INVENTION

This invention relates to methods for fabrication of separators for storage batteries. Particularly, it relates to methods for fabrication of separators for storage batteries with zinc negative electrodes.

BACKGROUND

Storage batteries with zinc (Zn) as negative electrode include zinc nickel batteries, zinc silver batteries, zinc air batteries, and, zinc manganese dioxide batteries. The disadvantage of these rechargeable batteries is short cycling life. The Zn products during discharge in these batteries are high soluble in the alkaline electrolyte of the battery. Therefore, during a battery's charge-discharge process, Zn repeatedly dissolves in the electrolyte solution and then precipitates on the electrodes. However, precipitation of Zn does not necessarily occur at the same location as where the Zn was dissolved. This results in the redistribution of zinc on the electrodes. The active material migrates from the edges of the electrode and congregates towards the center leading to the phenomenon called "distortion" or "shape change" of the zinc electrode. During cycling, this distortion of the zinc electrode gradually decreases the actual surface area, reducing the battery's capacity and shortening its cycle life. To limit this distortion phenomenon, efforts have been made to limit the migration of the zinc products during discharge or decrease the solubility of zinc products during discharge in the electrolyte solution. In addition, there is also research directed towards changing the non-uniformity of current density distribution on the electrodes. When current passes electrode, electrode polarization, i.e., the deviation of the electrode from its equilibrium potential, occurs. This electrode polarization effect increases with the increase in the current density of the electrode. It is equivalent to attaching an equivalent resistance on the surface of the electrode where the magnitude of the equivalent resistance increases and decreases with the magnitude of the electrode polarization.

The degree of polarization of a material for an electrode indicates the sensitivity of that material to changes in current density. When the current density in a material with a low degree of polarization increases, the polarization effect will not be apparent. On the other hand, when the current density in a material with a high degree of polarization increases, that material will be highly sensitive to the changes and slight changes in the current density will have significant polarization effects. Since the initial current distribution on the surface electrode is non-uniform, when the polarization of the zinc electrode is increased, the magnitude of the polarization effect and the corresponding magnitude of the equivalent resistance will also be non-uniform on the surface of the zinc electrode. Areas with high current densities will have high polarization and equivalent resistances while areas with low current density will have low polarization and equivalent resistances. This will result in the redistribution of the initial current density toward a more uniform actual current density on the surface of the electrode. Therefore, the distortion of the electrode can be reduced by increasing the uniformity of the distribution of the current density. Adjusting the equivalent resistances at different areas of the zinc electrode can achieve this uniformity. However, adjusting the equivalent resistances requires a relatively high degree of polarization. The oxides and hydroxides of lead, cadmium, thallium and indium can efficiently reduce the distortion due to a substrate effect. Lead oxide, indium hydroxide and thallium oxide reduce the distortion by increasing the degree of polarization and improving the distribution of the current density. After charging, the oxides of these metals in the zinc electrodes do not participate in the discharge process. They remain in a metallized state, and, during the next charging cycle, function as substrates for the reduction of zinc, producing a zinc product having a high degree of polarization. In contrast, mercury oxide increases the rate of distortion because the products during the charging process have a reduced degree of polarization. However, lead, cadmium, thallium cause severe contamination to the environment, and indium is an expensive metal. Therefore, in order to be environmentally friendly and have low production cost, it is necessary to find another method to improve the distribution of current density.

One method is to increase the layers and thickness of the separators at the edges of the electrodes that are in contact with the positive and negative electrodes. This increases the resistance between the positive and negative electrodes at their edges. This configuration lowers the current density at the edges of the electrodes and results in a more uniform distribution of the current density over the entire electrode. Currently, uniformity in current density distribution is improved by wrapping additional layers of separators at the edge of the positive electrode such that there are fewer wrapped layers at the center than at the edge of the electrode. However, this current method is only suitable for large and medium sized cubical or rectangular batteries. It is not suitable for use to fabricate smaller cylindrical batteries made by the winding method. For these small size cylindrical batteries with electrodes that are narrow and long, it is difficult to wrap a layer of material on the edges along the length of the electrode. Furthermore, after wrapping, the two electrodes cannot be wound. Moreover, this method of wrapping using micropore membranes that are 0.02~0.04 mm thick is cumbersome and inefficient.

Due to the limitations of the prior art, it is therefore desirable to have novel separators for storage batteries that are simple, low in cost, easy to manufacture, and can reduce the distortion of the zinc electrodes during cycling.

SUMMARY OF INVENTION

An object of this invention is to provide separators for storage batteries with zinc negative electrodes that can reduce the distortion of the zinc electrodes during cycling by improving the uniformity of the current distribution on the electrodes.

Another object of this invention is to provide separators for storage batteries that can control the current density distribution on the electrodes.

Another object of this invention is to provide separators for storage batteries with zinc negative electrodes that have simple structures and are low in cost.

Another object of this invention is to provide separators for storage batteries with zinc negative electrodes that can decrease the reduction of capacity during cycling and prolongs the life of the batteries.

Briefly, the present invention discloses enhanced separators for storage batteries with zinc negative electrodes. These enhanced separators include a separator layer and one or more resistive layers on said separator layer. The magnitude of the dimensions of the one or more resistive layers are less than or equal to that of the separator layer. Portions of the separator layer can be also treated with a PTFE suspension to increase the resistance at those portions. For storage batteries where the resistance along the edges of the separator layer has to be larger then the center, at least one resistive layer includes two independent parts positioned along two edges of the separator layer.

An advantage of this invention is that the enhanced separators of this invention can reduce the distortion of the zinc electrodes of storage batteries during cycling by improving the uniformity of the current distribution on the electrodes.

An advantage of this invention is that the enhanced separators of this invention can control the current distribution of the electrodes.

Another advantage of this invention is that the enhanced separators of this invention have simple structures and are low in cost.

Another advantage of this invention is that storage batteries with zinc negative electrodes and the enhanced separators of this invention have increased capacity and longer life.

DESCRIPTION OF DRAWINGS

The foregoing and other objects, aspects and advantages of the invention will be better understood from the following detailed description of preferred embodiments of this invention when taken in conjunction with the accompanying drawings in which.

DETAILED DESCRIPTION OF THE PREFERRED EMBODIMENTS

Presently preferred embodiments of this invention are enhanced separators for batteries that include a separator layer and one or more resistive layers on said separator layer. The magnitude of the first dimension ("width") and the magnitude of the second dimension ("length") of said resistive layers are less than or equal to the magnitude of the first and second dimensions of the separator layer. For a rectangular layer, the first dimension of that layer would be the dimension along its width and the magnitude of the first dimension would be the width of said layer. The second dimension of that rectangular layer would be the dimension along its length and the magnitude of the second dimension of that rectangular layer would be the length of that layer. For separators of storage batteries with zinc as the negative electrode, the separator layer is an absorbent material or a material than can hold liquids and one or more resistive layer is a wettable material containing micro-pores that are able to block the dendrites of zinc crystals. Said separator layer can be modified polypropylene felt, vinylon felt, or nylon felt. One or more said resistive layer can be polyethylene or polypropylene micropore membrane. Preferably, these materials are treated with a non-ionic surfactant. One or more said resistive layer can also be a radially grafted polyethylene membrane.

To control the uniformity of the current density in the electrodes, in preferred embodiments, there are 1 to 5 resistive layers on said separator layer. Preferably, 1 to 4 resistive layers comprise of two independent parts wherein the total width (magnitude of first dimension) of the two parts is less than the width (magnitude of first dimension) of the separator layer. In preferred embodiments, for each of said 1 to 4 layers, the total width of the two independent parts of the one or more resistive layer is between 20% and 80% of the width of the separator layer. Optimally, the total width of the two independent parts of the one or more resistive layer is between 40% and 60% of the width of the separator layer.

Figure 1:
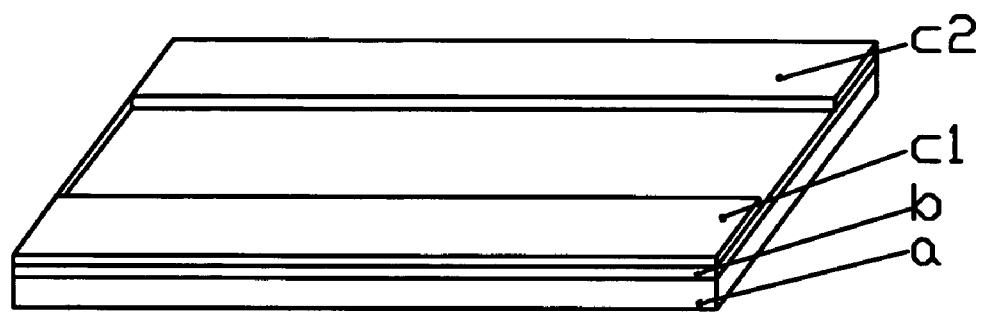
FIG. 1 is a diagram of an embodiment of this invention with two resistive layers.

FIG. 1 is the structural diagram of an embodiment of an enhanced separator where there are two resistive layers on top of a rectangular separator layer (a). One rectangular resistive layer (b) has the same dimensions as the separator layer. Another resistive layer has two independent rectangular parts, c1 and c2. The two independent parts are positioned along the edges of the separator layer along its length. The length of the two independent parts is the same as the length of the separator layer. The width of the two independent parts is less than or equal to the width of the separator layer.

Figure 2:
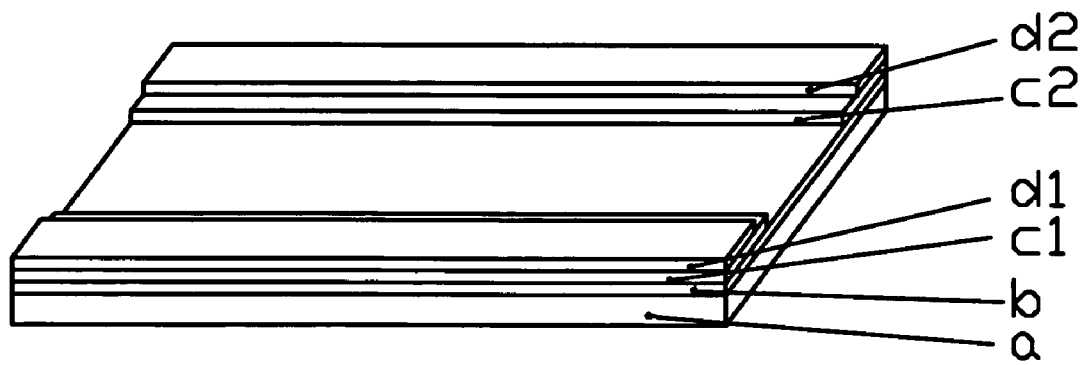
FIG. 2 is a diagram off an embodiment of this invention with three resistive layers.

FIG. 2 is the structural diagram of an embodiment of an enhanced separator where there are three resistive layers on a rectangular separator layer (a). One rectangular resistive layer (b) has the same length and width as the separator layer. Each of the second and third layers has two rectangular independent parts, c1 and c2, and, d1 and d2. The independent parts of these layers are positioned along the edges of the separator layer along its length. In this embodiment, the width of d1 and d2 is less than the width of c1 and c2 respectively. In other embodiments, in order to reach the desired current density profile, a number of resistive layers as well as a number of independent parts of each resistive layer can be added. To achieve a more uniform current density profile, the width of each successively added resistive layer is less then the previous and the sum of the width of the independent parts of each layer is less than the width of the separator layer.

In another embodiment, at least one resistive layer having a center portion and an edge portion where the thickness of said resistive layer at the edge portion is greater than the thickness of said resistive layer at the center portion. With this resistive layer, resistance of this layer at the center would be less than the resistance at the edges.

In embodiments where additional resistance is needed on certain portions of the enhanced separator, these portions can be treated with a polytetrafluoroethylene ("PTFE") suspension by soaking those portions ("treated portions") in the PTFE suspension. It is preferred that the concentration of PTFE in said PTFE suspension is between 30% and 60%.

Figure 3:
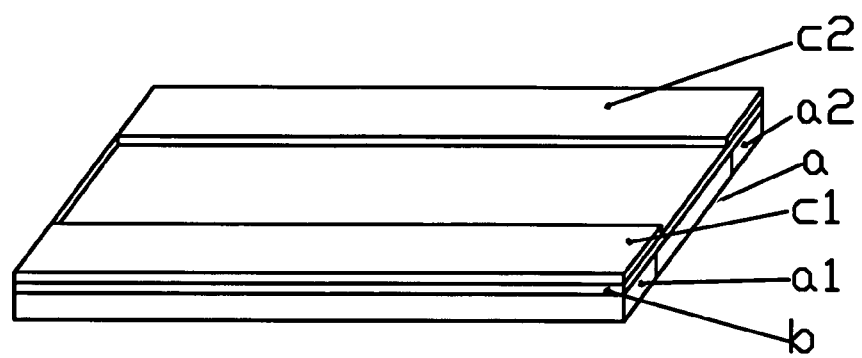
FIG. 3 is a diagram of another embodiment of this invention with two resistive layers and a separator layer with treated edges.

For example, if more resistance is needed along the edge portion of the separator layer, the edge portions of the separator layer are soaked in a PTFE suspension. In preferred embodiments, the width of a treated portion is between 10% and 20% of the total width the separator layer. Optimally, the width of a treated portion is between 10% and 20% of the total width of the separator layer. FIG. 3 shows an embodiment with a rectangular shaped separation layer and two resistive layers (b, c1 & c2). Two rectangular strips (a1 and a2) along the lengthwise edges of the separator layer are treated. It is preferred that the concentration of PTFE in said PTFE suspension is between 30% and 60%. In preferred embodiments, said separator layer is treated 2 to 6 times. Embodiments that are treated with PTFE suspension at the edge portions or have increased number of resistive layers on its edges have increased resistance at the edges. When one of these embodiments is used as the separator for a storage battery with a zinc negative electrode, it will cause the current density on the electrodes that are placed on the each side of the embodiments to be more uniformly distributed. This will limit the distortion of the zinc electrodes during the cycling process, thus limiting the reduction of capacity and significantly prolonging the life of the battery.

In preferred embodiments, the separator layer and the one or more resistive layers are welded together at high frequency radiation or bound with binding agents.

The following embodiments further describe this invention. The structure of these embodiments as shown in FIG. 1 comprises of a rectangular separator layer (a) and two resistive layers (b, c1 & c2) for blocking dendrites of zinc crystals. The separator layer and one ore more resistive layer are welded together with high frequency radiation or bound with binding agents.

Said separator layer (a) can be modified polypropylene felt, vinylon felt, or nylon felt. One ore more of said resistive layer can be the polyethylene or polypropylene micro-pore membrane treated with a non-ionic surfactant. For example, they can be any one of the polyethylene or polypropylene micro-pore membrane series treated with non-ionic surfactant and manufactured by Hoechst Celanese Corporation in the United States. In particular, Celgard 3400 series membranes such as Celgard 3400 or Celgard 3406 can be used. One ore more of said resistive layer can also be a radially grafted polyethylene membrane such as any one of radial grafted polyethylene membrane series fabricated by Shanghai Nuclear Institute, including CN-1000, CN-2000, and CN-2020.

The length and width of the one rectangular resistive layer (b) on said separator layer (a) are the same as the length and width of the separator layer (a). The other resistive layer is divided into two rectangular parts, (c1) and (c2) respectively. The total width of c1 and c2 is less than the width of the separator layer (a). However, their lengths are the same as the length of the separator layer. The total width of the two parts is between 20% and 80% of the width of the separator layer. The optimal range is at between 40% and 60%. The enhanced separator of this embodiment has three layers on its edges, one separator layer and two resistive layers. One edge of this enhanced separator has the three layers, a, b and c1 while the other edge has the three layers a, b and c2. The center of this embodiment only has two layers, one separator layer and one resistive layer.

In addition, in Embodiments 4, 5, and 6, portions of the separator layer (a1 and a2) are treated with PTFE suspensions where the concentration of the PTFE in said PTFE suspension is between 30% and 60%. These treated portions are rectangular shaped that are positioned along the lengthwise edges of the separator. The length of each treated portion is the same as the length of the separator layer while the width of each treated portion is less then the width of separation layer. The width of a treated portion is between 10% and 20% of the total width the separator layer. The optimal range is between 10% and 15%.

Embodiment 1

In this embodiment, the enhanced separator whose structure is shown in FIG. 1 is obtained by welding at high frequency the following layers of materials a piece of vinylon felt that is 210 mm long, 44 mm wide, and 0.15 mm thick as the separator layer (a); a piece of the wettable polyolefine micro-pore membrane (b) that is 210 mm long, 44 mm wide, and 0.025 mm thick as one resistive layer; and another resistive layer with two pieces of the wettable polyolefine micro-pore membranes (c1 and c2) that are each 210 mm long, 11 mm wide, and 0.025 thick as another resistive layer.

Embodiment 2

In this embodiment, the enhanced separator whose structure is shown in FIG. 1 is obtained by welding at high frequency the following layers of materials: one piece of vinylon felt that is 210 mm long, 44 mm wide, and 0.15 mm thick as the separator layer (a), one piece of wettable polyolefine micro-pore membrane (b) that is 210 mm long, 44 mm wide, and 0.025 mm thick as one resistive layer, and, two pieces of wettable polyolefine micro-pore membranes (c1, c2) that are each 210 mm long, 7.5 mm wide, and 0.025 mm thick as another resistive layer.

Embodiment 3

In this embodiment, the enhanced separator whose structure is shown in FIG. 1 is obtained by welding at high frequency the following layers of materials: one piece of vinylon felt that is 210 mm long, 44 mm wide, and 0.15 mm thick as the separator layer (a), one piece of wettable polyolefine micro-pore membrane (b) that is 210 mm long, 44 mm wide, and 0.025 mm thick as one resistive layer, and two pieces of wettable polyolefine micro-pore membranes (c1, c2) that are each 210 mm long, 17 mm wide, and, 0.025 mm thick as another resistive layer.

Embodiment 4

This embodiment is the same as Embodiment 1 except for the following:
the two portions (a1 and a2) of the separator layer (a) is treated with a PTFE suspension where the concentration of said PTFE in said PTFE suspension is 30% polytetrafluoroethylene suspension. The width of each of the treated portions (a1, a2) is 6.5 mm each. FIG. 3 is a diagram of the structure of this embodiment.

Embodiment 5

This embodiment is the same as Embodiment 2 except for the following:
the two portions (a1 and a2) of the separator layer (a) is treated with a PTFE suspension where the concentration of said PTFE in said PTFE suspension is 40% polytetrafluoroethylene suspension. The width of each of the treated portions (a1, a2) is 5 mm each. FIG. 3 is a diagram of the structure of this embodiment.

Embodiment 6

This embodiment is the same as Embodiment 3 except for the following:
the two portions (a1 and a2) of the separator layer (a) is treated with a PTFE suspension where the concentration of said PTFE in said PTFE suspension is 55% polytetrafluoroethylene suspension. The width of each of the treated portions (a1, a2) is 6 mm each. FIG. 3 is a diagram of the structure of this embodiment.

Comparison Example 1

The separator of the electrodes in this comparison example essentially comprises of a piece of vinylon felt as the separator layer that is 210 mm long, 44 mm wide, and 0.15 mm thick, and one piece of the wettable polyolefine micro-pore membrane that is 210 mm long, 44 mm wide, and 0.025 mm thick as the resistive layer. The two layers are welded together at high frequency.

Comparison Example 2

The separator of the electrodes in this comparison example essentially comprises of a piece of vinylon felt as the separator layer that is 210 mm long, 44 mm wide, and 0.15 mm thick, and two pieces of wettable polyolefine micro-pore membrane that is 210 mm long, 44 mm wide, and 0.025 mm thick. The three layers are welded together at high frequency.

Fabrication of Batteries for Testing of Properties

Storage batteries with negative electrodes are fabricated using the above embodiments and comparison examples in order to test the performance of the batteries. The fabrication method for the batteries are as follows:

Fabrication of Negative Electrodes

The fabrication of the negative electrodes includes:

mixing uniformly 10 g of mercury-free zinc powder, 60 g of zinc oxide, 9 g of calcium hydroxide and 3 g of conductive carbon black with mixing equipment;

stirring said mixture with 20 g of polyvinyl alcohol (PVA) where the concentration of the PVA concentration of 3%, 25 g of hydroxyl propyl methyl cellulose (HPMC) where the concentration of the HPMC is 2%, and 5 g of deionized water to form a paste;

coating said paste using a coating machine or a vertical dryer on a copper mesh belt that is 0.07 mm thick and 42 mm in wide and plated with a Pb—Sn alloy;

drying with heat;

rolling;

pressing;

cutting into slices; and welding conduction tabs to obtain several negative electrodes that are 95 mm long and 42 mm wide.

Fabrication of Positive Electrodes

The fabrication of positive electrodes comprises of the following:

stirring 92 g of spherical nickel hydroxide, 7 g of cobaltous oxide, 11 g of conductive carbon black, 3 g of polytetrafluoroethylene (PTFE), 0.2 g of sodium carboxy methyl cellulose (CMC) and 52 g of deionized water to form a paste;

coating said paste onto nickel foam that is welded with conduction tabs;

drying with heat;

rolling;

pressing; and slicing into pieces to obtain several positive electrodes that are 65 mm long and 40 mm wide.

Fabrication of a Battery

Figure 4:
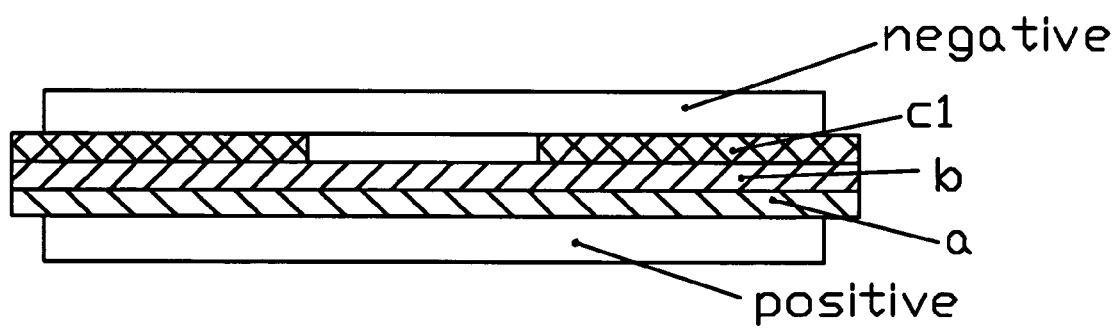
FIG. 4 is the diagram of the electrodes of a battery separated by an embodiment of this invention.

The fabrication of a battery comprises of the following steps:

winding the positive electrode and the negative electrode that are separated by the separator that are either an above Embodiments or Comparison Example with a winding machine to form the electrode core;

placing said core in an AA type battery steel can;

welding;

fluting; and injecting an electrolyte containing 25% of KOH and 1.5% of LiOH;

sealing to form a AA cylindrical zinc nickel battery of this invention is then obtained by sealing the battery. FIG. 4 shows the diagram of positive electrode and negative electrode separated by an enhanced separator that is an embodiment of this invention.

Testing of the Battery

After fabrication, the battery is repeatedly charged with 210 mA for 4 hours and then discharged at 210 mA to 1.2 v. The testing is concluded when the capacity of the battery is 70% of the initial capacity. The results of the testing for batteries with Embodiments 1 to 3 as separators are shown in Table 1. The results of the testing for the batteries with Embodiments 4-6 as separators are shown in Table 2 and the results of the testing of batteries with Comparison Examples 1 and 2 as separators are shown in Table 3.

TABLE 1

| Embodiments | Width of Separator Layer (mm) | Width of First Resistive Layer (b) (mm) | Total Width of the Two Parts of Second Resistive Layer (c1&c2) (mm) | Life of Battery (times) |
| --- | --- | --- | --- | --- |
| Embodiment1 | 44 | 44 | 22 | ≧500 |
| Embodiment2 | 44 | 44 | 15 | 440 |
| Embodiment3 | 44 | 44 | 34 | 380 |

TABLE 2

| Embodiments | Width of Separator Layer (mm) | Width of First Resistive Layer (b) (mm) | Total Width of the Two Parts of Second Resistive Layer (c1& c2) (mm) | Total Width of the Two Portions of Separator Layer Treated with PTFE (mm) | Life of Battery (times) |
| --- | --- | --- | --- | --- | --- |
| Embodiment 4 | 44 | 44 | 22 | 13 | ≧500 |
| Embodiment 5 | 44 | 44 | 15 | 10 | ≧500 |
| Embodiment 6 | 44 | 44 | 34 | 12 | 420 |

TABLE 3

| Comparison Example | Width of Separator Layer (mm) | Width of First Resistive Layer (mm) | Width of the Second Resistive Layer (mm) | Life of Battery (times) |
| --- | --- | --- | --- | --- |
| Comparison Example 1 | 44 | 44 | n/a | 350 |

TABLE 3-continued

| Comparison Example | Width of Separator Layer (mm) | Width of First Resistive Layer (mm) | Width of the Second Resistive Layer (mm) | Life of Battery (times) |
|---|---|---|---|---|
| Comparison Example 2 | 44 | 44 | 44 | 300 |

The test results in the tables clearly shows that the cycling life of the storage batteries using Embodiments 1 to 6 as separators is significantly longer than that of the storage batteries using Comparison Examples 1 and 2 as separators.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

I claim:

1. An enhanced separator for a battery, comprising:
a separator layer having a first dimension and a second dimension; and
two to five resistive layers, wherein each of the resistive layers has a first dimension and a second dimension and wherein the resistive layers are disposed on said separator layer; wherein
the magnitude of each of the first dimensions of a plurality of said resistive layers is less than the magnitude of the first dimension of said separator layer;
the magnitude of the second dimension of said resistive layers is equal to the magnitude of the second dimension of said separator layer;
the plurality of said resistive layers each comprising a separate first independent part and a separate second independent part;
said first independent part and second independent part each having a first dimension and a second dimension; and
the sum of the magnitude of the first dimension of said first independent part and the magnitude of the first dimension of said second independent part is less than the magnitude of the first dimension of said separator layer.

2. The enhanced separator of claim 1 wherein
said enhanced separator is used as a separator for storage batteries with zinc as the negative electrode; and
each of said resistive layers is a wettable micro-pore membrane.

3. The enhanced separator of claim 1 wherein said resistive layers are selected from the group consisting of: polyethylene micro-pore membrane, polyethylene micro-pore membrane treated with non-ionic surfactant, polypropylene micro-pore membrane, polypropylene micro-pore membrane treated with non-ionic surfactant; radially grafted polyethylene micro-pore membrane.

4. The enhanced separator of claim 1 wherein said separator layer is a material selected from the group consisting of: modified polypropylene felt, vinylon felt, and nylon felt.

5. The enhanced separator of claim 1 wherein said separator layer and the resistive layers are attached by welding, welding at high frequency, or binding with binding agent.

6. The enhanced separator of claim 1 wherein at least one of said resistive layers having an edge portion and a central portion and the thickness of said edge portion is greater than the thickness of said center portion.

7. The enhanced separator for a battery of claim 1 wherein the sum of the magnitude of said first dimension of said first independent part and the magnitude of said first dimension of said second independent part is between 20% and 80% of the magnitude of said first dimension of said separator layer.

8. The enhanced separator for a battery of claim 1 wherein the sum of the magnitude of said first dimension of said first independent part and the magnitude of said first dimension of said second independent part is between 40% and 60% of the magnitude of said first dimension of said separator layer.

9. The enhanced separator for a battery of claim 2 wherein the sum of the magnitude of said first dimension of said first independent part and the magnitude of said first dimension of said second independent part is between 20% and 80% of the magnitude of said separator layer.

10. The enhanced separator for a battery of claim 9 wherein
said separator layer and at least one resistive layer are attached by welding, welding at high frequency, or binding with binding agents;
said separator layer is selected from a group consisting of: modified polypropylene felt, vinylon felt, and nylon felt; and
at least one said resistive layer is selected from the group consisting of: polyethylene micro-pore membrane, polyethylene micro-pore membrane treated with non-ionic surfactant, polypropylene micro-pore membrane, polypropylene micro-pore membrane treated with non-ionic surfactant; and radially grafted polyethylene micro-pore membrane.

11. The enhanced separator of claim 1 wherein
said separator layer having at least one treated portion having a first dimension and a second dimension;
said treated portion has been treated at least once with a PTFE suspension;
the magnitude of the first dimension of at least one of said treated portion is between 10% and 20% of the magnitude of the first dimension of said separator layer;
the magnitude of the second dimension of at least one said treated portion is less than or equal to the magnitude of said second dimension of said separator layer; and
the concentration of PTFE in said PTFE suspension is between 30% and 60%.

12. The enhanced separator of claim 1 wherein
said separator layer having at least one treated portion having a first dimension and a second dimension;
said treated portion has been treated at least once with a PTFE suspension;
the magnitude of the first dimension of said treated portion is less than or equal to the magnitude of the first dimension of said separator layer; and
the magnitude of the second dimension of said treated portion is less than or equal to the magnitude of the second dimension of said separator layer.

13. The separator layer of claim 12 wherein the magnitude of said first dimension of at least one of said treated portion is between 10% and 20% of the magnitude of the first dimension of said separator layer.

14. The separator layer of claim 12 wherein the magnitude of the first dimension of at least one of said treated portion is between 10% and 15% of the magnitude of the first dimension of said separator layer.

15. The separator layer of claim 12 wherein the concentration of PTFE in said PTFE suspension is between 30% and 60%.

16. The separator layer of claim 15 wherein the magnitude of the first dimension of at least one of said treated portion is between 10% and 20% of the magnitude of the first dimension of said separator layer.

17. An enhanced separator for a battery, comprising:
- a separator layer having a first dimension and a second dimension; and
- two to five resistive layers, wherein each of the resistive layers has a first dimension and a second dimension and wherein the resistive layers are disposed on said separator layer; wherein
- the magnitude of each of the first dimensions of a plurality of said resistive layers is less than the magnitude of the first dimension of said separator layer;
- the magnitude of the second dimension of each of said resistive layers is equal to the magnitude of the second dimension of said separator layer;
- the plurality of said resistive layers each comprising a first independent part and a second independent part;
- said first independent part and said second independent part each having a first dimension and a second dimension;
- the sum of the magnitude of said first dimension of said first independent part and the magnitude of said first dimension of said second independent part is between 20% and 80% of the magnitude of the first dimension said separator layer;
- said separator layer and at least one resistive layer are attached by welding, welding at high frequency, or binding with binding agent;
- said separator layer is a material selected from a group consisting of: modified polypropylene felt, vinylon felt, and nylon felt;
- said separator layer comprising at least one treated portion having a first dimension and a second dimension;
- said treated portion has been treated at least once with a PTFE suspension;
- the concentration of PTFE in said PTFE suspension is between 30% and 60%;
- the magnitude of the first dimension of at least one said treated portion is between 10% and 20% of the magnitude of the magnitude of the first dimension of said separator layer;
- the magnitude of the second dimension of at least one said treated portion is less than the magnitude of said second dimension of said separator layer; and
- each of said resistive layers is selected from the group consisting of: polyethylene micro-pore membrane, polyethylene micro-pore membrane treated with non-ionic surfactant, polypropylene micro-pore membrane, polypropylene micro-pore membrane treated with non-ionic surfactant; and, radially grafted polyethylene micro-pore membrane.

* * * * *